(12) United States Patent
Trindade de Sousa Monteiro

(10) Patent No.: US 8,337,137 B2
(45) Date of Patent: Dec. 25, 2012

(54) TRANSFER MODULE FOR TRANSFERRING PARTS BETWEEN WORK STATIONS

(76) Inventor: Luciano Trindade de Sousa Monteiro, Sao Caetano do Sul (BR)

( * ) Notice: Subject to any disclaimer, the term of this patent is extended or adjusted under 35 U.S.C. 154(b) by 197 days.

(21) Appl. No.: 12/568,553

(22) Filed: Sep. 28, 2009

(65) Prior Publication Data

US 2010/0080675 A1    Apr. 1, 2010

(30) Foreign Application Priority Data

Sep. 29, 2008   (BR) .................................... 0803973

(51) Int. Cl.
*B65G 65/00* (2006.01)
(52) U.S. Cl. .................. 414/751.1; 72/405.13; 100/207; 198/740
(58) Field of Classification Search ............... 414/751.1; 72/405.13; 198/740, 741; 100/207
See application file for complete search history.

(56) References Cited

U.S. PATENT DOCUMENTS

| 4,833,908 A * | 5/1989 | Sofy .......................... 72/405.16 |
| 4,875,931 A | 10/1989 | Monteiro |
| 5,941,119 A | 8/1999 | Monteiro |
| 2005/0274212 A1 | 12/2005 | De Sousa Monteiro |
| 2007/0134082 A1* | 6/2007 | Blomgren et al. ......... 414/751.1 |

FOREIGN PATENT DOCUMENTS

| BR | 8701734 | 8/1987 |
| BR | 9606122 | 9/1998 |
| BR | 0302078 | 3/2005 |
| EP | 0307438 B1 | 6/1992 |
| EP | 0849015 A2 | 6/1998 |
| EP | 1502674 A2 | 2/2005 |

* cited by examiner

*Primary Examiner* — Donald Underwood
(74) *Attorney, Agent, or Firm* — Reising Ethington P.C.

(57) ABSTRACT

A transfer apparatus has a vertical guide rod, on which a vertical carriage slides, which is integrated with a horizontal carriage, both of which support a transfer bar and gripping members that are responsible for the automatic handling of stamped parts in process. The transfer apparatus has a shaft limiter, below which there is a right angle lever with a stop, and a horizontal guide rod where the horizontal carriage slides. The transfer apparatus has a drive lever to drive a connecting rod which is connected to the right angle lever and has an adjustable stop toward a fixed stop, which limits the travel of the horizontal carriage in the Y-axis direction. The transfer apparatus in question has a continuous operating cycle and is controlled by a central processing unit.

6 Claims, 4 Drawing Sheets

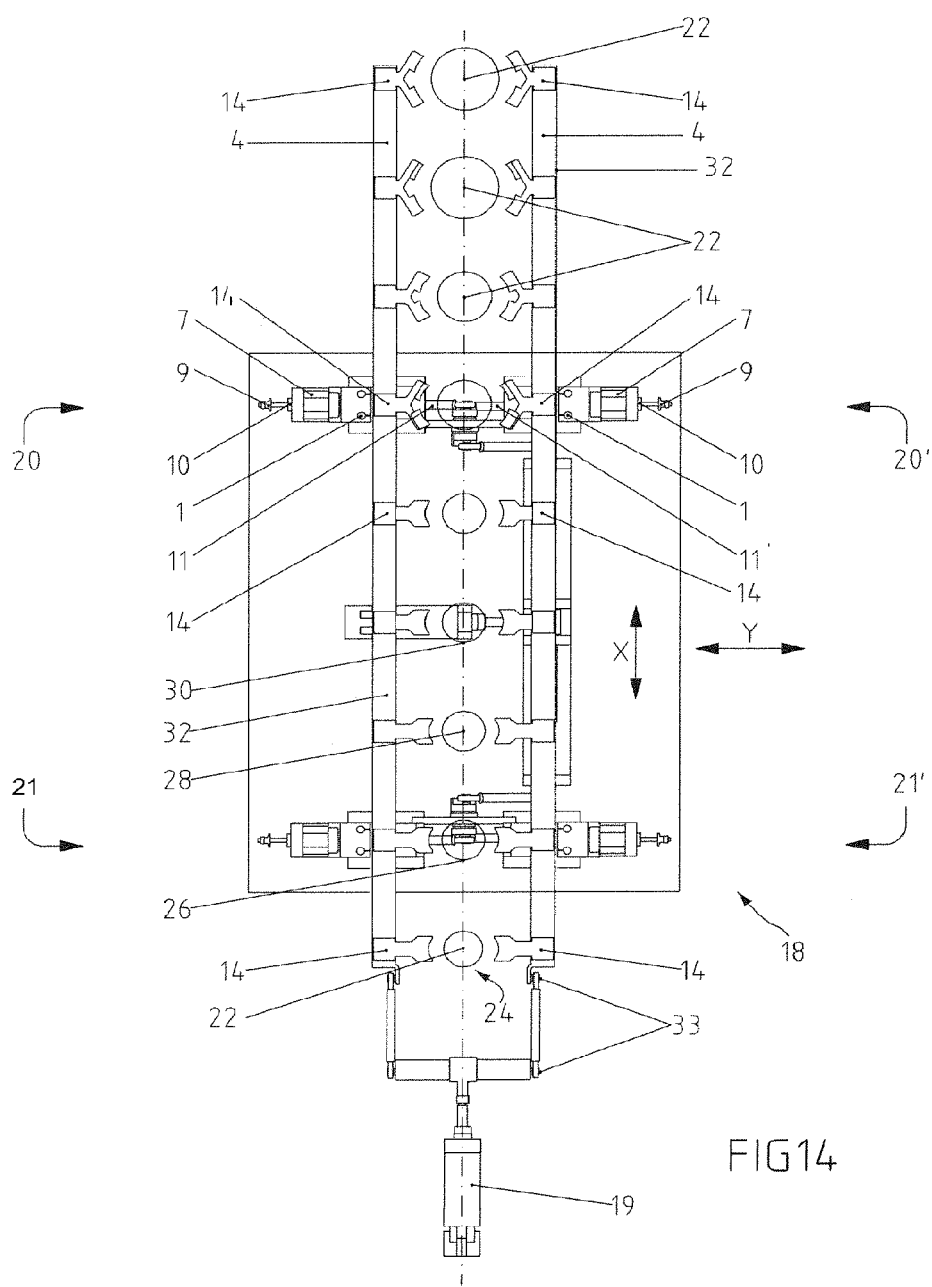

TRANSFER MODULE FOR TRANSFERRING PARTS BETWEEN WORK STATIONS

REFERENCE TO RELATED APPLICATIONS

This application claims priority from Brazilian Patent Application No. PI-0803973-9 filed Sep. 29, 2008, the entire contents of which are hereby incorporated by reference into this application.

TECHNICAL FIELD

The present invention generally relates to a transfer apparatus, such as the type commonly used to transfer stamped, molded or other processed parts between work stations.

BACKGROUND

It is known for systems to use part transference between sequential work stations in a manufacturing process, particularly in a stamping press. Other processes and equipment, sometimes referred to as transfer sets, may also be used for the transference of parts that are to be formed, molded and are installed inside or adjacent their work process, known as operations. These are usually installed in the equipment (presses) in order to process the parts in a sequence of operations to be manufactured. This parts transference can be made manually (e.g., average production of around 350 parts per hour), but due to the demand for higher productivity of equipment, there is an increased demand for automated systems that allow the press to work in a continuous cycle (e.g., average production of 1,000 to 1,500 parts/hour). The advantages to the cost of parts can be obvious and substantial, however, the parts transference between the various process stages while the press (or other machine) is working in a continuous cycle requires technology.

SUMMARY

According to one embodiment, there is provided a transfer apparatus for moving parts between work stations and for use in equipment such as transfers and the like. The transfer apparatus is characterized by having: a vertical guide rod which slides up and down; a vertical carriage; and a horizontal carriage with forward and back displacement where there is mounted a transfer bar and gripping elements. The transfer apparatus is provided with a shaft limiter, which is located below a right angle lever, this with a stop and a horizontal guide rod, in which slides forward and back the whole horizontal carriage.

BRIEF DESCRIPTION OF THE DRAWINGS

Preferred exemplary embodiments of the invention will hereinafter be described in conjunction with the appended drawings, wherein like designations denote like elements, and wherein:

FIG. 13 is an elevation view of the transfer apparatus of FIG. 1, wherein the apparatus is shown opposing an additional transfer apparatus; and FIG. 14 is a schematic plan view of the transfer apparatus of FIG. 1, wherein the apparatus is shown—along with three other transfer apparatuses—being installed along a manufacturing line.

DETAILED DESCRIPTION OF THE PREFERRED EMBODIMENTS

Figure 1:
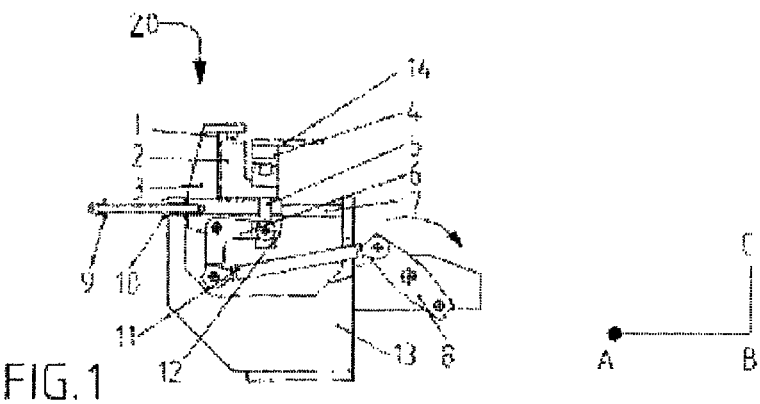
FIG. 1 is an elevation view of an exemplary transfer apparatus, where the apparatus is shown in an open and non-elevated position.

A transfer apparatus 20 is shown and described below that may be used to transfer parts or components between different work stations and, depending on the particular embodiment, may provide movement in an X-axis direction (horizontal), a Y-axis direction (horizontal) and/or a Z-axis direction (vertical). According to an exemplary two-axis embodiment, the transfer apparatus engages in movement in the X- and Y-axes; in an exemplary three-axis embodiment, the transfer apparatus engages in movement in the X-, Y- and Z-axes. In both cases, transfer apparatus 20 engages a transfer mechanism 32 and causes it to grasp and transfer parts from one work station to the next so that separate machines—such as stamping, molding and/or welding machines—can each work the parts as they cycle through. It should be appreciated that the transfer apparatus 20 and transfer mechanism 32 shown and described herein may be used with any combination of machines and equipment, and are not limited to the stamping, molding and/or welding machines mentioned above. Furthermore, the transfer apparatus 20 and the transfer mechanism 32 may be used to move, index or advance any type of part, component or work piece, and is not limited to any one particular type.

With reference to FIG. 14, a general overview of a manufacturing line 18 is shown, where the manufacturing line includes two pairs of opposing transfer apparatuses 20, 20' and 21, 21' that are mounted along a sequence of work stations 24, 26, 28, 30, etc. Each of the work stations may include one or more types of suitable machines, such as the exemplary stamping, molding and/or welding machines mentioned above. The two pairs of opposing transfer apparatuses 20, 20' and 21, 21' work together to engage and operate a transfer mechanism 32, which includes two longitudinal transfer bars 4 and a number of pairs of gripping members 14. Each pair of gripping members 14 grasps and releases parts 22 so that they can be moved or advanced between work stations 24, 26, 28, 30, etc. Generally speaking, transfer apparatuses 20, 20' and 21, 21' drive transfer mechanism 32 between open and closed positions (Y-axis movement) and between non-elevated and elevated positions (Z-axis movement), while a drive mechanism 19 moves the transfer mechanism 32 between work stations (X-axis movement). Those skilled in the art will appreciate that any number of different drive mechanisms 19 may be used with the transfer mechanism 32 described below, and that the transfer mechanism is not limited to any one particular drive mechanism. Each of the drive apparatuses 20, 20' and 21, 21' may be both modular and compact; that is, each drive apparatus may be an independent unit that can be combined with other apparatuses and easily rearranged or interchanged to form different systems, and is small and makes an efficient use of space.

In an open position (i.e., retracted away from a centerline CL that longitudinally extends down the length of manufacturing line 18), transfer mechanism 32 is opened up such that it does not engage the parts 22. This allows each of the work stations 24, 26, 28, 30, etc. to perform their designated task on their respective part 22. In a closed position (i.e., advanced towards the centerline CL), transfer mechanism 32 is closed such that it engages or grasps the parts 22 and is ready to index or advance them to the next work station. When it is time to transfer or advance the parts to the next work station, the transfer apparatuses 20, 20' and 21, 21' are also in a closed position so that transfer mechanism 32 simultaneously engages all of the parts along the manufacturing line 18, and drive mechanism 19 moves the entire transfer mechanism 32 along the X-axis so that all of the parts move together. The transfer apparatuses 20, 20' and 21, 21' then cause the transfer mechanism 32 to release the parts so that the transfer mechanism can be returned along the X-axis to its previous position. Although FIG. 14 shows two pairs of transfer apparatuses (a first pair 20, 20' and a second pair 21, 21'), it should be appreciated that a different number of transfer apparatuses may be used with manufacturing line 18. For instance, shorter manufacturing lines having fewer work stations may have a single transfer apparatus pair; longer manufacturing lines having greater work stations may need three or more pairs of transfer apparatuses. The transfer apparatus 20 and transfer mechanism 32 described herein are not limited to any particular arrangement.

Figures 6, 7:
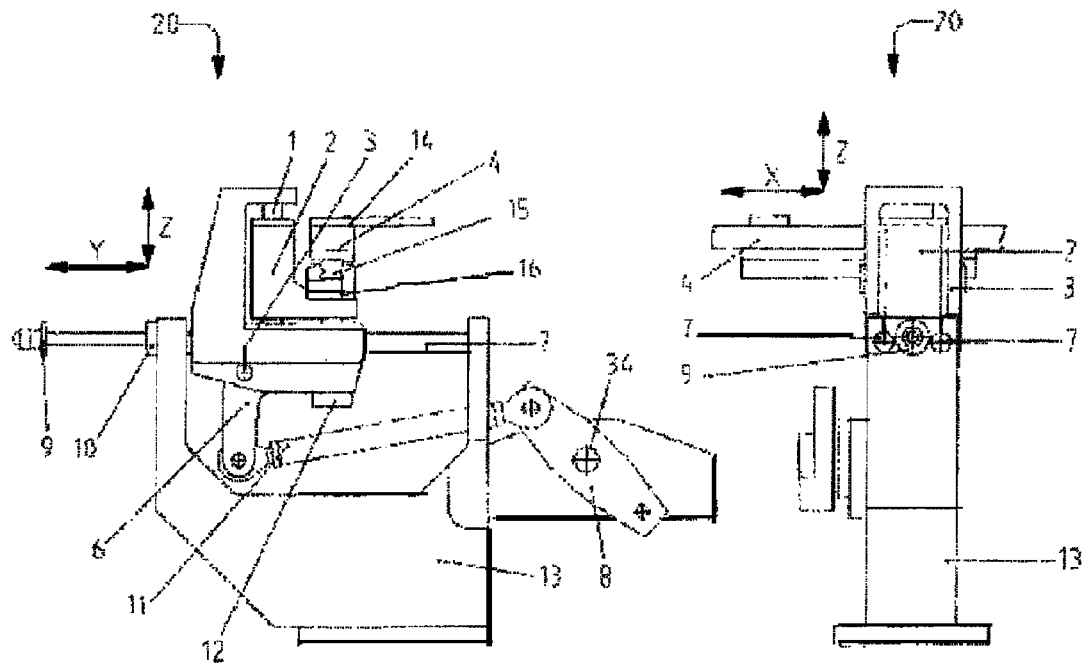
FIG. 6 is an enlarged elevation view of the transfer apparatus of FIG. 1.
FIG. 7 is a side view of the transfer apparatus of FIG. 1.
Figure 8:
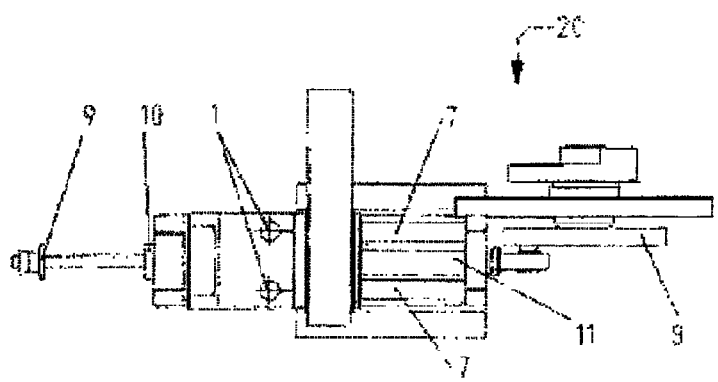
FIG. 8 is a plan view of the transfer apparatus of FIG. 1.
Figure 9:
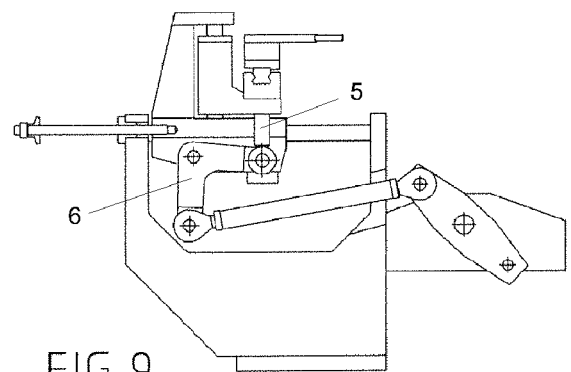
FIG. 9 is another elevation view of the transfer apparatus of FIG. 1.
Figure 10:
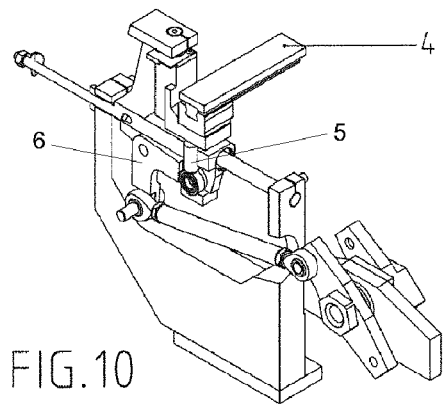
FIG. 10 is a perspective view of the transfer apparatus of FIG. 1.

Turning now to FIGS. 6-8, there is shown an exemplary embodiment of transfer apparatus 20 (transfer apparatus 20' may be a mirror image and is thus not separately described here). Transfer apparatus 20 may include one or more vertical guide rods 1, a vertical carriage 2, a horizontal carriage 3, a shaft limiter 5, a right angle lever 6, one or more horizontal guide rods 7, a drive member 8, an adjustable stop 9, a fixed stop 10, a connecting rod 11, a stop 12, and a base 13. An exemplary transfer mechanism 32, shown best in FIG. 14, includes a pair of elongated transfer bars 4 that carry a number of pairs of gripping members 14 and are driven back and forth along an X-axis by drive mechanism 19. The drive mechanism 19 is coupled to the transfer bars 4 by one or more flexible joints 33 that enable the transfer bars to be spread apart and brought together under the power of the transfer apparatuses 20, 20' and 21, 21' without being disconnected from the drive mechanism. Any number of different drive mechanism/flexible joint arrangements known in the art may be used.

The vertical guide rods 1 are aligned so that vertical carriage 2 can slide up and down in the Z-axis direction; as subsequently explained, this feature is optional as some embodiments may not require vertical or Z-axis movement. Similarly, horizontal guide rods 7 are aligned so that horizontal carriage 3 can move back and forth in the Y-axis direction. A single guide rod or multiple guide rods may be used for items 1 and 7. Adjustable and fixed stops 9 and 10 may be used to limit or control the range of motion in the Y-axis direction. Right angle lever 6 is shown here having a generally L-shaped or right-angle configuration and is operably attached between connecting rod 11 and shaft limiter 5. It is not necessary that right angle lever 6 be L-shaped, as other configurations and arrangements are certainly possible; but a 90° transfer of movement can result from 90° action points, and the "L" shape shown in the drawings is a simple and suitable shape for that.

Drive member 8 may be driven by a rotational drive mechanism (not shown) about a center shaft 34, and is pivotally attached to one end of connecting rod 11. As best shown in FIG. 13, a single drive member 8 may be connected to a first connecting rod 11 of a first transfer apparatus 20 and to a second connecting rod 11' of a second transfer apparatus 20', such that the two connecting rods move in unison in response to rotation of drive member 8 about shaft 34. Base 13 acts as a foundation for transfer apparatus 20, and may be securely fastened to the floor of the manufacturing facility or to some other pedestal or foundational component. Gripping members 14 are operably mounted to and carried by transfer bars 4 and are designed to grasp or clutch parts 22 so that they can be advanced from one work station to the next. The particular design and nature of the gripping members 14 may be dictated by the part or work piece that they are intended to move; not all of the gripping members 14 need to be the same, as a work piece may require different types of gripping members as it advances through the manufacturing line. For example, some gripping members may have soft rubbery pads for gently engaging a work piece, while others may be equipped with suction and/or magnetic elements, for example, for indexing sheet metal stock. Additional guide rods, carriages, transfer bars, shafts, stops, members, elements, and other components could also be used to provide additional freedoms of motion and capabilities to the exemplary transfer apparatus and transfer mechanism shown here.

Figure 2:
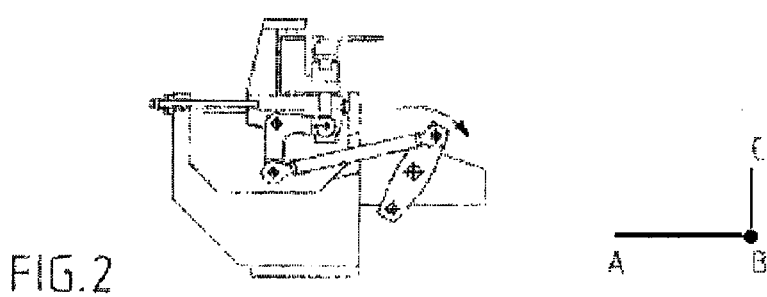
FIG. 2 is an elevation view of the transfer apparatus of FIG. 1, wherein the apparatus is shown in a closed and non-elevated position.
Figure 3:
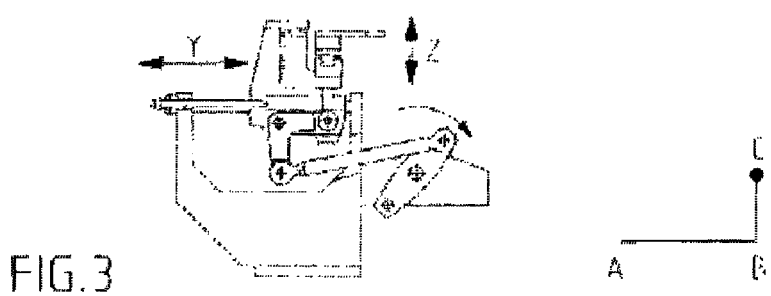
FIG. 3 is an elevation view of the transfer apparatus of FIG. 1, wherein the apparatus is shown in a closed and elevated position.
Figure 4:
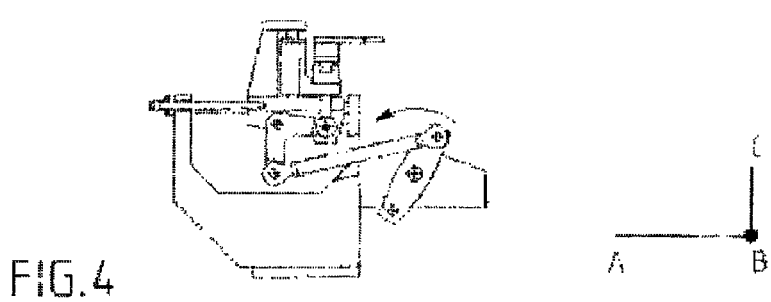
FIG. 4 is another elevation view of the transfer apparatus in the closed and non-elevated position of FIG. 2.
Figure 5:
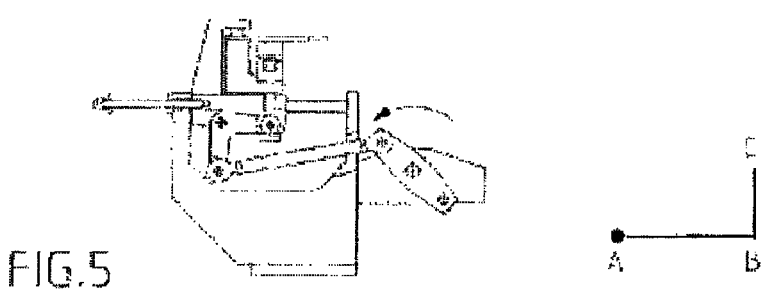
FIG. 5 is another elevation view of the transfer apparatus in the open and non-elevated position of FIG. 1.

FIGS. 1-5 illustrate an operating cycle for transfer apparatus 20, where the machine transitions through the following sequence of positions: from an open and non-elevated position (position "A") in FIG. 1, to a closed and non-elevated position (position "B") in FIG. 2, to an optional closed and elevated position (position "C") in FIG. 3, back to a closed and non-elevated position in FIG. 4, and back to an open and non-elevated position in FIG. 5. Movement between open and closed positions generally involves moving along the Y-axis, while movement between the non-elevated and elevated positions generally involves moving along the Z-axis. Transferring parts or components between operating stations typically involves moving along the X-axis, and is illustrated in FIGS. 7 and 14. Skilled artisans should appreciate that the transfer apparatus described herein is not limited to a three-axis embodiment, and that a two-axis embodiment that does not provide for movement in the Z-axis is also possible.

Beginning with FIG. 1, the exemplary transfer apparatus 20 is shown in a starting or open position (position "A"), where the transfer bars 4 and gripping members 14 are in an open position. This may occur in the operating cycle just after the point when the part is stamped, molded, or otherwise formed by the various work stations 26, 28, 28, 30, etc. At the appropriate time, a command is generated that causes a rotational drive mechanism (e.g., one having pneumatic, hydraulic and/or electric drive means) to rotate drive member 8 in a clockwise direction (see arrows in FIGS. 1-2) such that connecting rod 11 is pulled back towards the centerline CL. This, in turn, pulls horizontal carriage 3 along horizontal guide rods 7 towards the centerline CL so that the gripping members 14, which are carried by transfer bars 4, may contact and handle the part 22. These actions result in the closed and non-elevated position of FIG. 2 (position "B"). It should be appreciated that a concurrent and synchronized event also occurs with transfer apparatus 20', which is located across the centerline CL from transfer apparatus 20, so that part 22 is engaged by a pair of opposing gripping members 14.

In a two-axis embodiment, the transfer apparatus 20 generally does not perform any vertical lifting or Z-axis movement. Therefore, the part 22 would be ready to be transferred to the next work station along the X-axis under the power of drive mechanism 19 without experiencing any vertical displacement. In a three-axis embodiment, however, an additional lifting step (Z-axis movement) may be performed before the part 22 is advanced to the next work station. Such a step may be helpful for properly evacuating or removing the part from the work station. This is shown as the closed and elevated position in FIG. 3 (position "C") and is an optional step. According to one embodiment, once the drive member 8 reaches the position illustrated in FIG. 2 and stops 9 and 10 engage one another so that further Y-axis movement is prohibited, the pivotal connections at one or both ends of the connecting rod 11 lock (e.g., the pivotal connection between the inner end of connecting rod 11 and drive member 8 lock and/or the pivotal connection between the outer end of connecting rod 11 and the lower end of right angle lever 6 lock) such that additional clockwise rotation of the drive member 8 causes the right angle lever 6 to lift up in the vertical direction (Z-axis). This in turn causes the vertical carriage 2 to slide up the vertical guide rods 1 such that the transfer bars 4 and gripping members 14 lift up the various parts or components 22 before advancing them to the next work station. A corresponding and concurrent sequence of events may occur in the other transfer apparatus 20' located across the centerline CL, such that transfer mechanism 32 and parts 22 are vertically lifted out of their respective work station (Z-axis movement) before being advanced or indexed to the next work station (X-axis movement).

Transfer mechanism 32 may grip and move the parts 22 along the X-axis according to one of a number of different techniques. In one embodiment, the X-axis movement is provided by drive mechanism 19 which pushes and pulls the transfer bars 4 in the X-axis direction (i.e., a direction parallel to the centerline CL) so that a keyed or male component 15 of the transfer bar 4 can slide within a complementary female component 16 of the vertical carriage 2 (see FIG. 6). The embodiment shown in the drawings uses a dovetail-type arrangement, however, this is only one possibility as other arrangements are certainly possible. This X-axis movement occurs simultaneously at all of the work stations so that all of the parts in the system are indexed or advanced together. In the exemplary sequence of steps illustrated in FIGS. 1-5, this X-axis movement or advancement between work stations may occur between FIGS. 3 and 4.

Once the parts 22 have been properly advanced to the next work station, transfer apparatus 20 may be used to lower the parts into place for additional processing; closed and non-elevated position in FIG. 4 (position "B"). At the end of the part transfer (X-axis movement) and the lowering of the parts (Z-axis movement), a reverse set of steps may be performed in order to return the transfer apparatus 20 and transfer mechanism 32 to their initial open and non-elevated position (position "A"). Drive member 8 can be rotated in the counter clockwise direction so that connecting rod 11 is pushed outward and the transfer apparatus returns to the open and non-elevated position of FIG. 5 (position "A"). The drive mechanism 19 can then be used to return the different transfer apparatuses along the X-axis to their initial positions; thus, completing the cycle. This occurs simultaneously at all of the transfer apparatuses 20, 20' and 21, 21' so that both transfer bars 4 and all of the gripping members 14 are opened and closed together. Thus, FIGS. 1-5 demonstrate an operating cycle that can be used in a continuous process, where the next operating cycle simply picks up where the preceding one left off.

Figure 11:
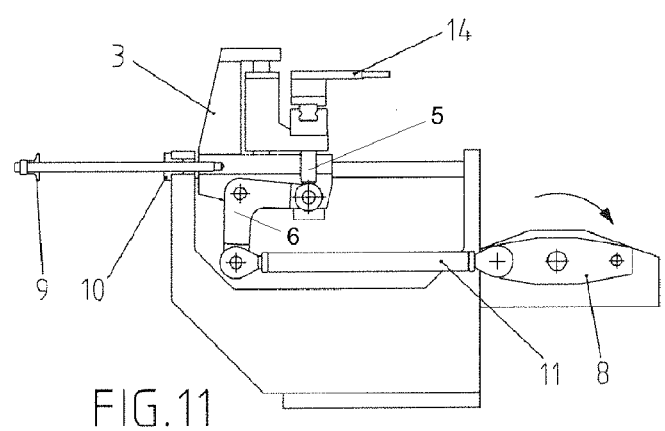
FIG. 11 is an elevation view of the transfer apparatus of FIG. 1, wherein the apparatus is shown in a fully opened position.
Figure 12:
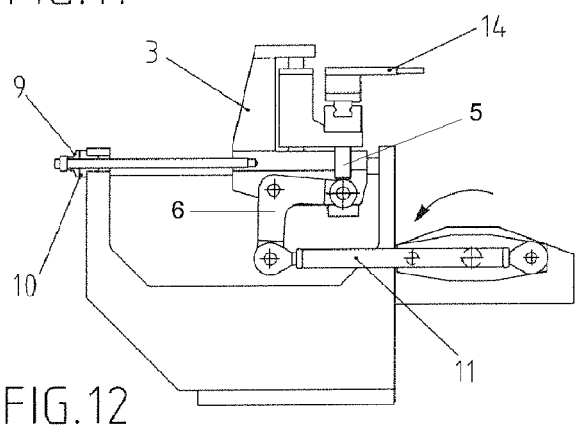
FIG. 12 is an elevation view of the transfer apparatus of FIG. 1, wherein the apparatus is shown in a fully closed position.

According to an exemplary embodiment, the transfer apparatus 20 may be driven between the "fully open" and "fully closed" positions shown in FIGS. 11-12. Put differently, it is possible for drive member 8 to be driven through 180° of displacement so that a certain amount of mechanical acceleration and/or deceleration is experienced. This may be helpful, for example, when the drive member 8 is driven by a pneumatic or hydraulic cylinder in the rotational drive mechanism. The fully open position occurs when the gripping members 14 are pushed furthest away from the centerline CL; this is demonstrated in FIG. 11, where the connecting rod 11 is in a generally horizontal orientation. The fully closed position occurs when gripping members 14 are pulled closest to the centerline CL, and is demonstrated in FIG. 12. In the fully closed position, the horizontal carriage 3 is pulled as close as possible to the centerline CL so that adjustable stop 9 contacts fixed stop 10 and prevents the transfer apparatus from additional Y-axis movement towards the centerline CL. The movement inhibiting interaction between stops 9 and 10 can be seen in FIG. 12.

Skilled artisans will appreciate that any combination of known components, devices, features, etc. may be used with the exemplary transfer apparatus 20 described above. For example, an electric motor and/or a hydraulic or pneumatic cylinder may be used in any of the drive mechanisms in order to facilitate the various horizontal, vertical and/or rotational movements described above. Moreover, the description provided above in connection with the exemplary transfer apparatus 20 applies equally to transfer apparatuses 20', 21, 21', etc.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A transfer apparatus for moving parts between work stations and for use in equipment such as transfers and the like, characterized by having:
   a vertical guide rod;

a vertical carriage which slides up and down on the vertical guide rod;

a horizontal guide rod;

a horizontal carriage which slides forward and back on the horizontal guide rod;

a shaft limiter that is coupled to the vertical carriage and to a right angle lever; and a stop that is coupled to the horizontal guide rod and limits forward movement by the horizontal carriage, wherein the vertical carriage is configured to support a transfer bar with a plurality of gripping members so that the transfer bar can slide within the vertical carriage, and the horizontal carriage is configured to support the vertical carriage so that the vertical carriage can at least partially slide within the horizontal carriage.

2. The transfer apparatus of claim 1 wherein the stop is an adjustable stop, and the right angle lever is configured to convert movement in the horizontal Y-axis to movement in the vertical Z-axis when the adjustable stop contacts a separate fixed stop.

3. The transfer apparatus of claim 1, wherein the transfer apparatus comprises a drive lever that moves a connecting rod and the right angle lever through a single drive, and does so for one or more transfer apparatuses in parallel and positioned on opposite sides of the drive lever.

4. The transfer apparatus of claim 3, wherein the drive lever is configured with a 180 degrees angular displacement that produces a linear motion of the connecting rod with acceleration and deceleration mechanics.

5. An assembly line that comprises a plurality of transfer apparatuses including the transfer apparatus of claim 1, wherein the plurality of transfer apparatuses are integrated and work in parallel or work in similar positions or work on opposite sides of the assembly line in order to automatically transfer parts between several work stations.

6. A transfer apparatus for use with a transfer mechanism that transfers parts or components between different work stations, comprising:

a drive member;

a vertical carriage that slides up and down on a vertical guide rod;

a horizontal carriage that slides forward and back on a horizontal guide rod;

at least one stop coupled to the horizontal carriage that limits its forward movement;

a connecting arm with first and second ends where the connecting arm first end is coupled to the drive member;

an angled lever with first and second ends where the angled lever first end is coupled to the connecting arm second end; and a shaft limiter with first and second ends where the shaft limiter first end is coupled to the angled lever second end and the shaft limiter second end is coupled to the vertical carriage, wherein once the stop limits further forward movement by the horizontal carriage, the angled lever is configured to convert further movement by the drive member into up or down movement by the vertical carriage.

* * * * *